(12) United States Patent
He

(10) Patent No.: US 8,219,064 B2
(45) Date of Patent: Jul. 10, 2012

(54) METHOD, SYSTEM, AND APPARATUS FOR PREVENTING BIDDING DOWN ATTACKS DURING MOTION OF USER EQUIPMENT

(75) Inventor: Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 326 days.

(21) Appl. No.: 12/535,889

(22) Filed: Aug. 5, 2009

(65) Prior Publication Data

US 2009/0298471 A1 Dec. 3, 2009

Related U.S. Application Data

(63) Continuation of application No. PCT/CN2008/072192, filed on Aug. 29, 2008.

(30) Foreign Application Priority Data

Sep. 3, 2007 (CN) .......................... 2007 1 0149327

(51) Int. Cl.
*H04M 1/66* (2006.01)
(52) U.S. Cl. ........................................ 455/411; 455/410
(58) Field of Classification Search .................. 455/419, 455/420
See application file for complete search history.

(56) References Cited

U.S. PATENT DOCUMENTS

| 2002/0066011 A1 | 5/2002 | Vialen et al. |
| 2008/0102896 A1 | 5/2008 | Wang et al. |
| 2011/0059736 A1* | 3/2011 | Norrman et al. ............. 455/424 |

FOREIGN PATENT DOCUMENTS

| CN | 1527576 A | 9/2004 |
| CN | 1771709 A | 5/2006 |
| CN | 1913701 A | 2/2007 |
| CN | 101001252 | 7/2007 |
| KR | 10-0576013 | 4/2006 |

OTHER PUBLICATIONS

International Search Report from P.R. China in International Application No. PCT/CN2008/072192 mailed Nov. 20, 2008.

(Continued)

*Primary Examiner* — Kamran Afshar
*Assistant Examiner* — Sayed T Zewari
(74) *Attorney, Agent, or Firm* — Finnegan, Henderson, Farabow, Garrett & Dunner LLP

(57) ABSTRACT

A method for preventing bidding down attacks during motion of a User Equipment (UE) is provided. The method includes the UE sends a Tracking Area Update (TAU) Request message to a new MME, the TAU Request carries UE's security capabilities, the UE receives UE's security capabilities sent by the MME, and the UE checks whether the received UE's security capabilities are consistent with the stored UE's security capabilities. A system, an MME, and a UE for preventing bidding down attacks during motion of the UE are also provided. When the UE performs security capability negotiation with the MME, the UE can check whether the received security capabilities are consistent with the stored security capabilities, and determine whether a bidding down attack exists, and therefore may prevent bidding down attacks.

12 Claims, 2 Drawing Sheets

OTHER PUBLICATIONS

3GPP TR 33.821 V0.3.0 May 2007—Technical Report; 3rd Generation Partnership Project; Technical Specification Group Services and System Aspects; Rationale and track of security decisions in Long Term Evolved (LTE) RAN / 3GPP System Architecture Evolution (SAE); (Release 8); (84 pgs.).

3GPP TR 33.821 V0.4.0 Jul. 2007—*Technical Report*; 3rd Generation Partnership Project; Technical Specification Group Services and System Aspects; Rationale and track of security decisions in Long Term Evolved (LTE) RAN / 3GPP System Architecture Evolution (SAE); (Release 8); (94 pgs.).

ETSI TS 133 102 V7.1.0 Dec. 2006—*Technical Specification*; Universal Mobile Telecommunications System (UMTS); 3G Security; Security Architecture (3GPP TS 33.102 Version 7.1.0 Release 7); (65 pgs.).

Written Opinion of the International Search Authority related to International Application No. PCT/CN2008/072192; mailed on Nov. 20, 2008 for Huawei Tech Co., Ltd., (3 pgs.).

The Extended European Search Report related to European Application No. 08800704.2-2413 / 2106190, mailing date of Mar. 3, 2010 for Huawei Tech Co., Ltd., (6 pgs.).

First Chinese Office Action of Chinese Application No. 200710149327.5; Mailing Date: Jun. 26, 2009; (5 pgs.).

Second Chinese Office Action of Chinese Application No. 200710149327.5, Mailing Date: Apr. 29, 2010, (5 pgs.).

Rejection Decision of Chinese Application No. 200710149327.5; Mailing Date: Sep. 2, 2010; (7 pgs.).

European Patent Office Communication pursuant to Article 94(3) EPC for Application No. 08800704.2-2413, mailed Dec. 16, 2011 (6 pgs).

Notice of Reasons for Rejection, issued in related Japanese Application No. 2010-520411, mailing date Feb. 21, 2012, Ref. No. GNP-07172.

3GPP TS 23.401 V1.1.0, "$3^{rd}$ Generation Partnership Project; Technical Specification Group Services and System Aspects; GPRS enchancements for E-UTRAN access (Release 8)", GSM Global System for Mobile Communications. Jul. 2007.

\* cited by examiner

US 8,219,064 B2

METHOD, SYSTEM, AND APPARATUS FOR PREVENTING BIDDING DOWN ATTACKS DURING MOTION OF USER EQUIPMENT

CROSS-REFERENCE TO RELATED APPLICATIONS

This application is a continuation of International Application No. PCT/CN2008/072192, filed on Aug. 29, 2008, which claims the benefit of priority of Chinese Patent Application No. 200710149327.5, filed on Sep. 3, 2007. The contents of the above identified applications are incorporated herein by reference in their entireties.

TECHNICAL FIELD

The present disclosure relates to mobile communication, and in particular, to a method, a system, and an apparatus for preventing bidding down attacks during motion of a User Equipment (UE).

BACKGROUND

A radio network includes two parts: radio access network (RAN) and core network. A Long Term Evolution (LTE) radio core network includes a Mobile Management Entity (MME). The functions of the MME are similar to the functions of a Serving General Packet Radio Service (GPRS) Supporting Node (SGSN), and include mobility management and user authentication. When a UE is in the idle state, the UE needs to negotiate the Non-Access Signaling (NAS) security algorithms with the MME, including the NAS encryption algorithm and the NAS integrity protection algorithm in order to ensure the system security in the communication process of the UE.

When the UE in the idle state moves in an LTE radio access network, or moves from a 2G/3G network to an LTE network, a Tracking Area Update (TAU) process occurs. In this process, the entity that performs mobility management and user authentication for the UE may change. For example, when the UE moves in an LTE network, the entity that performs mobility management and user authentication for the UE changes from the MME prior to moving (the old MME) to the MME subsequent to moving (the new MME). When the UE moves from a 2G/3G network to an LTE network, the entity that performs mobility management and user authentication for the UE changes from the SGSN to the MME. The security capabilities of different entities that perform mobility management and user authentication for the UE may differ. Therefore, the UE needs to renegotiate security capabilities with the new MME. For the LTE network, the negotiation of security capabilities between the UE and the MME is primarily negotiation of the NAS security algorithm and the corresponding key negotiation.

FIG. 1 is a flowchart of security capability negotiation between the UE and the MME in the prior art. As shown in FIG. 1, the method of security capability negotiation includes the following steps:

Step 100: The UE sends a TAU Request to the new MME.

In this step, the UE sends a TAU Request to the new MME through an evolution Node B (eNB) of the LTE radio access network. For ease of description in the following text, the message transferred by an eNB between the UE and the MME is simplified as communication performed directly between the UE and the MME.

Steps 101-102: The new MME sends a Mobility Management Context Request message to the old MME. After receiving the message, the old MME returns a Mobility Management Context Response message to the new MME, and this message carries the current root key "Kasme", the current integrity protection key (Knas-int), the current NAS encryption key (Knas-enc), the current NAS security algorithm, and the security capabilities supported by the UE (including the NAS/Radio Resource Control (RRC)/User Plane (UP) security algorithm supported by the UE).

Step 103: According to the intersection of the NAS security algorithms in the UE's security capabilities, the NAS security algorithms supported by the new MME, and the NAS security algorithms enabled by the system, the new MME selects a new NAS security algorithm, including the NAS integrity protection algorithm and the NAS encryption algorithm.

Step 104: The new MME sends TAU Accept message to the UE. The message carries the selected new NAS security algorithm.

In practice, other steps, unrelated to security capability negotiation that occurs between step 103 and step 104, are omitted here.

Step 105: The UE receives the TAU Accept message that carries the selected NAS security algorithm to share the NAS security algorithm with the MME. Afterward, the UE checks the NAS security algorithm carried in the TAU Accept message. If the carried NAS security algorithm is the same as the NAS security algorithm currently used by the UE, the Knas-int and the Knas-enc currently used by the UE serve as the subsequent NAS protection key. If the carried NAS security algorithm is different from the NAS security algorithm currently used by the UE, a new Knas-int and a new Knas-enc need to be deduced according to the root key (Kasme) currently used by the UE and other parameters, and serve as the subsequent NAS protection key shared with the MME. In this way, the security capabilities are negotiated between the UE and the MME.

Evidently, no process of preventing "bidding down attacks" is performed in the prior art. A "bidding down attack" is described as follows: Supposing that the UE supports two security algorithms simultaneously (high-intensity algorithm A1 and low-intensity algorithm A2) and the MME also supports such two algorithms, the result of negotiation between the UE and the MME ought to be the high-intensity algorithm A1. However, if the security capabilities supported by the UE are modified by an attacker before the new MME knows the security capabilities supported by the UE, for example, if the attacker reserves only the low-intensity algorithm A2, the new MME has to select the low-intensity algorithm A2 and sends it to the UE. That is, the result of negotiation between the UE and the MME is not the high-intensity algorithm A1, but the low-intensity algorithm A2, which is more vulnerable to attacks, namely, bidding down attacks. Therefore, the prior art does not prevent bidding down attacks. The result of negotiation between the MME and the UE may be a low-intensity algorithm. Consequently, in the subsequent communication process, the communication between the UE and the MME is vulnerable to attacks, and the subsequent interaction between the UE and the network is not secure.

BRIEF SUMMARY

A method for preventing bidding down attacks during motion of a UE is provided. The method includes sending, by a User Equipment (UE), a Tracking Area Update (TAU) Request message to a Mobile Management Entity (MME), wherein the TAU Request carries UE's security capabilities, receiving UE's security capabilities sent by the MME, and determining that a bidding down attack occurs if the received UE's security capabilities are inconsistent with the stored UE's security capabilities A system for preventing bidding down attacks during motion of a UE is also provided. The system includes a User Equipment (UE), configured to send a Tracking Area Update (TAU) Request message to the Mobile Management Entity (MME), receive the UE's security capabilities sent by the MME, wherein the TAU Request carries UE's security capabilities, and check whether the received UE's security capabilities are consistent with the stored UE's security capabilities. The system also includes an MME, configured to receive the TAU Request from the UE, obtain the UE's security capabilities from the TAU Request, and send the obtained UE's security capabilities to the UE.

An Mobile Management Entity (MME) is also provided. The MME includes: an obtaining module, configured to receive the Tracking Area Update (TAU) Request message from a User Equipment (UE), where the message carries the UE's security capabilities, and a delivering module, configured to send the UE's security capabilities received by the obtaining module to the UE through a TAU Accept message.

A User Equipment (UE) is further provided. The UE includes an updating module, configured to send a TAU Request message to the MME, wherein the TAU Request carries UE's security capabilities, and a judging module, configured to receive the UE's security capabilities sent by the MME, and judge whether the received UE's security capabilities are consistent with the security capabilities stored by the storing module.

Consistent with some embodiments, after the UE sends a TAU Request message to the MME, the UE receives the UE's security capabilities obtained and sent by the MME, and determines that a bidding down attack occurs if the received UE's security capabilities are inconsistent with the stored security capabilities. Therefore, if the UE's security capabilities obtained by the MME are attacked, when the MME delivers the UE's security capabilities to the UE in the process of security capability negotiation between the UE and the MME, the UE determines that a bidding down attack occurs if finding that the received UE's security capabilities are inconsistent with the stored security capabilities. In this way, bidding down attacks are prevented, and the security of the subsequent interaction between the UE and the network is ensured.

The accompanying drawings, which are incorporated in and constitute a part of this specification, illustrate some embodiments and together with the description, serve to explain the principles of the embodiments disclosed herein.

DETAILED DESCRIPTION

In the following description specific details are set forth describing the embodiments disclosed herein. It will be apparent, however, to one skilled in the art that some embodiments may be practiced without some or all of these specific details. The specific embodiments disclosed herein are meant to be illustrative but not limiting. One skilled in the art may realize other material that, although not specifically described herein, is within the scope and spirit of this disclosure.

Figure 1:
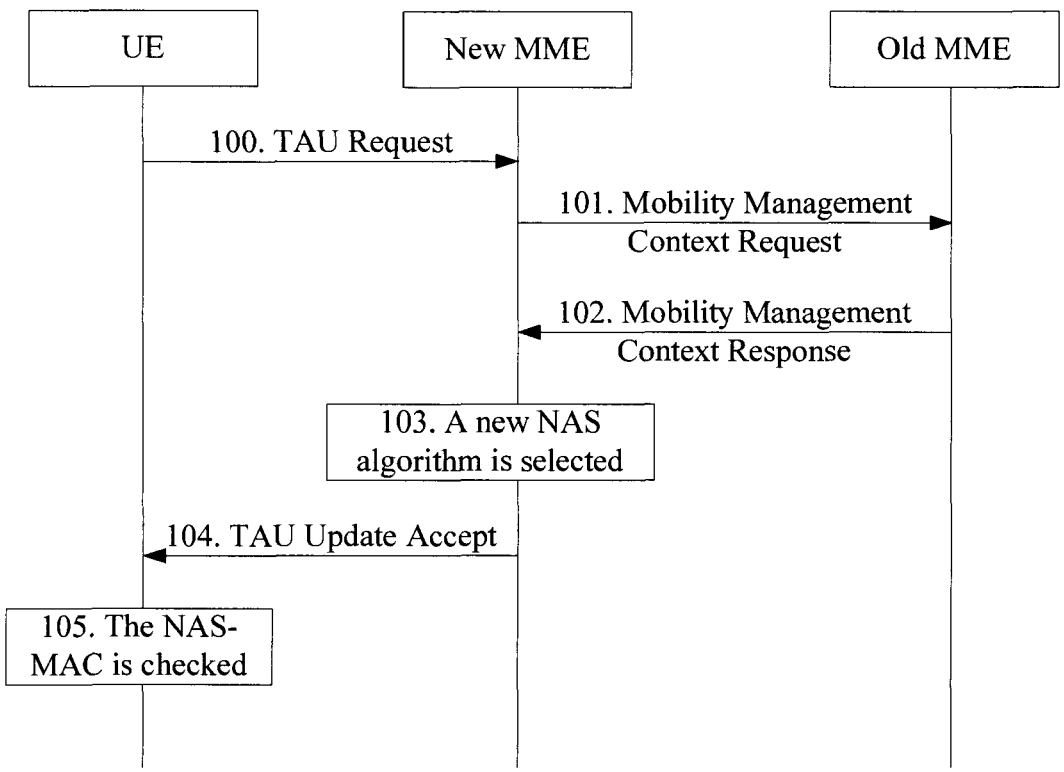
FIG. 1 is a flowchart of a method for security capability negotiation during motion of a UE in the prior art.
Figure 2:
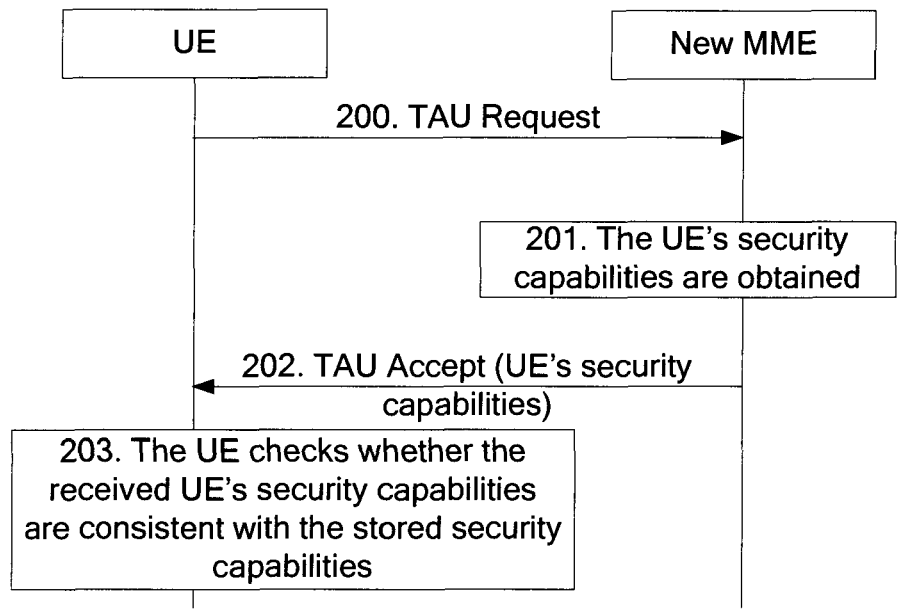
FIG. 2 is a flowchart of a method for preventing bidding down attacks during motion of a UE according to some embodiments.

FIG. 2 is a flowchart of a method for preventing bidding down attacks during motion of a UE according to some embodiments. As shown in FIG. 2, the method includes the following steps:

In step 200, the new MME receives a TAU Request message from the UE. In step 201, the new MME obtains the UE's security capabilities. In step 202, through a TAU Accept message, the UE's security capabilities are sent to the UE. In step 203, the UE checks whether the received UE's security capabilities are consistent with the stored security capabilities.

Figure 3:
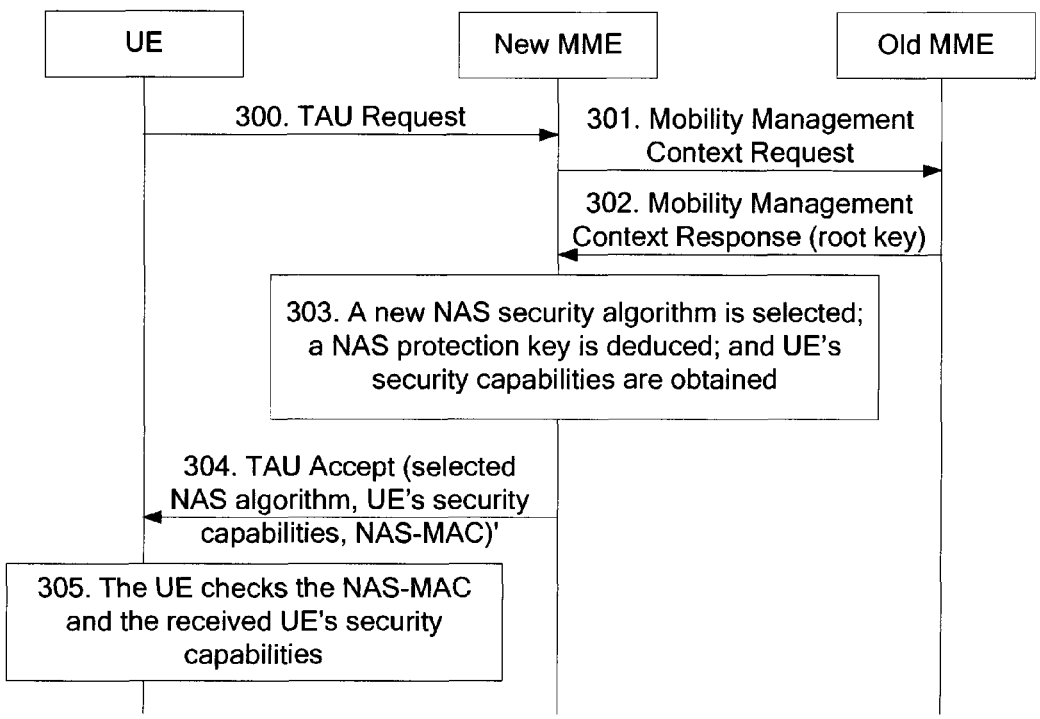
FIG. 3 is a flowchart of a method for security capability negotiation during motion of a UE according to some embodiments.

FIG. 3 is a flowchart of a method for security capability negotiation during motion of a UE according to some embodiments. The method includes the following steps:

Step 300: The UE sends a TAU Request message to the new MME.

In this step, the UE sends a TAU Request to the new MME through an evolution Node B (eNB) of the LTE radio access network. For ease of description in the following text, the communication transferred by an eNB between the UE and the MME is simplified as communication performed directly between the UE and the MME.

The TAU Request sent by the UE to the MME in this step may carry not only the parameters well known to those skilled in the art such as Temporary Mobile Subscriber Identifier (TMSI), but also the UE's security capabilities, for example, NAS security algorithms (NAS integrity protection algorithm and encryption algorithm), the RRC security algorithms (RRC integrity protection algorithm and encryption algorithm), and/or UP security algorithm (UP encryption algorithm).

Steps 301-302: The new MME sends a Mobility Management Context Request message to the old MME. The old MME sends a Mobility Management Context Response message to the new MME, and this message carries the current NAS security algorithm list and the current root key (Kasme).

If the TAU Request sent by the UE to the MME in step 300 does not carry the UE's security capabilities, the old MME searches for the UE's security capabilities after receiving the Mobility Management Context Request message, and adds the found UE's security capabilities into a Mobility Management Context Response message sent to the MME.

Step 303: According to the intersection of the NAS security algorithms in the UE's security capabilities, the NAS security algorithms supported by the new MME, and the NAS security algorithms enabled by the system, the new MME selects a new NAS security algorithm. Afterward, a new NAS protection key (including a Knas-int and a Knas-enc) is deduced according to the root key (Kasme) currently used by the UE and other parameters, and serves as the subsequent NAS security key.

If the new NAS algorithm is different from the current NAS security algorithm returned by the old MME, it is necessary to reset the counter to prevent replay attacks.

Step 304: The new MME sends TAU Accept message to the UE. The message carries the selected new NAS security algorithm and the UE's security capabilities.

In this step, the MME may perform NAS integrity protection for the TAU Accept message. For example, by using the Knas-int deduced in step 303, the information in the TAU Accept, and the NAS integrity protection algorithm in the NAS security algorithms, the MME deduces a NAS integrity protection Message Authentication Code (NAS-MAC) value, and adds this value into the TAU Accept message and sends the message to the UE.

In this step, the MME may deliver the selected new NAS security algorithm and the UE's security capabilities to the UE by using a Security Mode Command (SMC) request message, the details of which are not elaborated here any further.

In practice, other steps unrelated to security capability negotiation may occur between step 303 and step 304, and are omitted here.

Step 305: The UE checks whether the received UE's security capabilities are consistent with the stored security capabilities.

In this step, if the UE finds that the received UE's security capabilities are consistent with the security capabilities stored by the UE, the UE determines that no bidding down attack occurs; otherwise, the UE determines that a bidding down attack occurs. If it is determined that the security capability negotiation fails, the security capability negotiation process may be initiated again, thus preventing bidding down attacks.

In this step, the UE may further check the NAS security algorithm carried in the TAU Accept message. If the carried NAS security algorithm is the same as the NAS security algorithm currently used by the UE, the Knas-int currently used by the UE and the Knas-enc currently used by the UE are used as the subsequent NAS protection key. If the carried NAS security algorithm is different from the NAS security algorithm currently used by the UE (or the old MME), a new Knas-int and a new Knas-enc need to be deduced according to the root key (Kasme) currently used by the UE and other parameters, and serve as the subsequent NAS security key. The counter is reset to prevent replay attacks.

In this step, the UE may check whether the NAS-MAC in the received TAU accept message is correct. If the NAS-MAC is not correct, the UE determines that the security capability negotiation fails, and may reinitiate the security capability negotiation process. For example, according the deduced Knas-enc, the information in the TAU Accept, and the NAS integrity protection algorithm carried in the TAU Accept message, the UE deduces a NAS-MAC, and checks whether the deduced NAS-MAC is the same as the NAS-MAC carried in the TAU Accept message. If they are the same, the message is not changed in the transmission process; otherwise, the message is changed in the transmission process and the security capability negotiation fails.

In this way, the NAS security capability negotiation between the UE and the new MME is completed in the TAU process.

In the foregoing process, the detailed deducing process for the UE and the MME to deduce the NAS protection key according to the Kasme is accomplished using known methods, and is not elaborated herein.

Figure 4:
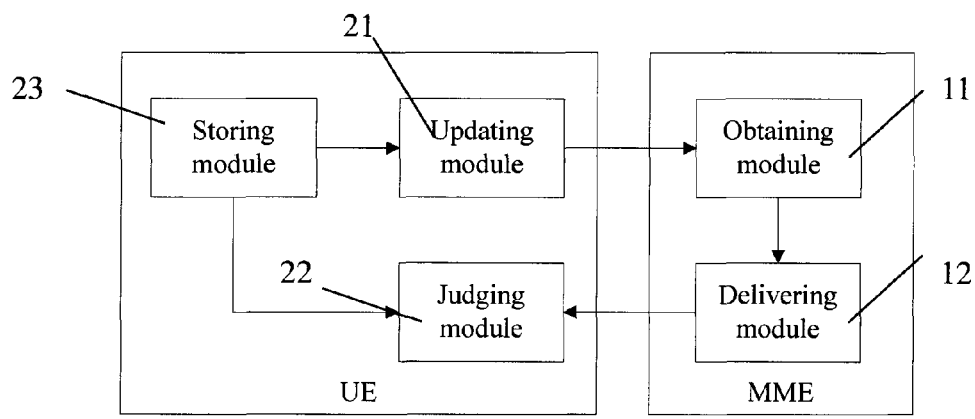
FIG. 4 shows a structure of a system for preventing bidding down attacks during motion of a UE according to some embodiments.

FIG. 4 shows a structure of a system for preventing bidding down attacks during motion of a UE according to some embodiments. As shown in FIG. 4, the system includes:

a UE, configured to: send a TAU Request message to the MME; receive the UE's security capabilities sent by the new MME; and check whether the received UE's security capabilities are consistent with the stored security capabilities; and an MME, configured to: receive the TAU Request message from the UE, obtain the UE's security capabilities, and send the obtained UE's security capabilities to the UE.

Further, the UE adds the UE's security capabilities into the TAU Request message.

Specifically, the MME includes:

an obtaining module 11, configured to receive the TAU Request message from the UE, where the message carries the UE's security capabilities; and a delivering module 12, configured to send the UE's security capabilities received by the obtaining module 11 to the UE through a TAU Response message.

The obtaining module 11 further obtains the current root key. The MME further includes:

a selecting module 13, configured to select a NAS security algorithm according to the UE's security capabilities; and a key deducing module 14, configured to deduce a NAS protection key according to the root key obtained by the obtaining module 11 and the NAS security algorithm selected by the selecting module 13.

Accordingly, the UE includes:

an updating module 21, configured to send a TAU Request message to the MME; and a judging module 22, configured to: receive the UE's security capabilities sent by the MME, and judge whether the received UE's security capabilities are consistent with the stored security capabilities.

The UE further includes a storing module 23, configured to store the UE's security capabilities. The updating module 21 may add the UE's security capabilities into the TAU Request message.

Some embodiments as described herein may improve upon prior art methods in a few ways. Firstly, the UE sends a TAU Request message to the MME, and then receives the UE's security capabilities obtained and sent by the MME; and determines that a bidding down attack occurs if finding that the received UE's security capabilities are inconsistent with the stored security capabilities. Therefore, if the UE's security capabilities obtained by the MME are attacked or modified, when the MME delivers the UE's security capabilities to the UE in the process of security capability negotiation between the UE and the MME, the UE can detect bidding down attacks. In this way, bidding down attacks are prevented.

Secondly, the new MME selects a new NAS security algorithm according to the relevant security capabilities (NAS/RRC/UP security algorithm) of the UE and the LTE network. In the prior art, the old MME returns the UE's security capabilities to the new MME through a Context Response message. The UE reports all its security capabilities to the old MME through other processes before the TAU process. Therefore, the prior art is practicable for an idle UE that moves inside an LTE network. However, the idle UE may move from a 2G/3G network to an LTE network. Before moving to the LTE network, the UE reports only the security capabilities related to the 2G/3G network to the SGSN, and does not report the security capabilities related to the LTE network to the SGSN proactively. After the UE moves to the LTE network, the prior art is still applied, the SGSN still needs to query the UE about the UE's security capabilities related to the LTE network before the SGSN can report such security capabilities to the new MME, which may involve upgrade of the existing network increase unnecessary round trips. According to some embodiments as disclosed herein, the UE sends the UE's security capabilities to the new MME through a TAU Request message. Therefore, the new MME does not need to query the old MME about the UE's security capabilities when the UE moves inside the LTE network. When the UE moves from a 2G/3G network to an LTE network, the SGSN does not need to query the UE's security capabilities. In this way, the processing of the network equipment is simplified, and the working efficiency of the system is improved.

Thirdly, in the prior art, after the MME selects the new NAS security algorithm, the MME needs to judge whether the new NAS security algorithm is consistent with the NAS security algorithm currently used by the old MME. If the new NAS security algorithm is consistent with the NAS security algorithm currently used by the old MME, the Knas-int and the Knas-enc currently in use serve as the subsequent NAS security key. If the new NAS security algorithm is inconsistent with the NAS security algorithm currently used by the old MME, a new Knas-int and a new Knas-enc need to be deduced according to the root key (Kasme) currently in use and other parameters, and serve as the subsequent NAS security key. Therefore, the old MME needs to return the Knas-int and the Knas-enc currently in use to the new MME through an Context Response message. Such parameters are intended for the new MME to use the existing keys as far as possible and reduce the calculation load. In fact, however, such parameters are useful only when the new NAS security algorithm selected by the MME is consistent with the NAS security algorithm currently used by the old MME. If the new NAS security algorithm is different from the NAS security algorithm currently used by the old MME, the new MME still needs to deduce such keys, which does not reduce the calculation load, but makes the MME processing more complicated. The parameters carried in the message sent to the new MME are redundant. According to some embodiments as disclosed herein, after the new MME selects a new NAS security algorithm, no matter whether the selected NAS algorithm is consistent with the NAS security algorithm currently in use, the new MME deduces the algorithm again, thus eliminating the redundancy of the parameters in the message exchanged between the old MME and the new MME. Meanwhile, some embodiment as disclosed herein make use of the existing NAS protection key algorithm to obtain the NAS protection key, thus simplifying the MME processing. With the algorithm being the same as that in the prior art, the embodiments disclosed herein do not increase any calculation load.

It is understandable to those skilled in the art that all or part of the steps of the foregoing embodiments may be implemented by hardware instructed by a computer program. The program may be stored in a computer-readable storage medium. Once being executed, the program performs the processes covered in the foregoing embodiments. The storage medium may be a magnetic disk, compact disk, Read-Only Memory (ROM), or Random Access Memory (RAM).

Although the disclosure has been described through several preferred embodiments, the disclosure is not limited to such embodiments. It is apparent that those skilled in the art can make modifications and variations to the embodiments disclosed herein without departing from the spirit and scope of the disclosure. The disclosure is intended to cover the modifications and variations provided that they fall in the scope of protection defined by the claims or their equivalents.

What is claimed is:

1. A method for preventing bidding down attacks during motion of a User Equipment (UE) comprising:
   sending, by the UE, a Tracking Area Update (TAU) Request to a Mobility Management Entity (MME), wherein the TAU Request carries a first set of security capabilities stored in the UE;
   receiving, by the UE, a second set of security capabilities sent by the MME; and
   determining, by the UE, that a bidding down attack occurs if the the second set of security capabilities are inconsistent with the first set of security capabilities.

2. The method of claim 1, wherein the method further comprises:
   obtaining, by the MME, the first set of security capabilities from the TAU Request before sending the second set of security capabilities to the UE.

3. The method of claim 1, wherein the method further comprises:
   selecting, by the MME, a Non Access Signaling (NAS) security algorithm according to the second set of security capabilities before sending the second set of security capabilities to the UE.

4. The method of claim 1, wherein before the MME sends the second set of security capabilities to the UE, the method further comprises:
   obtaining, by the MME, a root key currently in use; and
   deducing a NAS protection key according to the root key currently in use.

5. The method of claim 3, wherein after the MME selects the NAS security algorithm according to the second set of security capabilities, the method further comprises:
   sending, by the MME, a TAU Accept message carrying the second set of security capabilities to the UE, wherein the TAU Accept message further carries the selected NAS security algorithm.

6. The method of claim 5, wherein after sending, by the MME, the TAU Accept message carrying the second set of security capabilities to the UE, the method further comprises:
   judging, by the UE, whether the received NAS security algorithm is the same as an NAS security algorithm currently in use by the UE;
   using a current NAS protection key if the received NAS security algorithm is the same as the NAS security algorithm currently in use; and
   deducing an NAS protection key according to the root key currently in use if the received NAS security algorithm is different from the NAS security algorithm currently in use.

7. A system for preventing bidding down attacks during motion of a User Equipment (UE) comprising:
   a UE configured to send a Tracking Area Update (TAU) Request to a Mobility Management Entity (MME) wherein the TAU Request carries a first set of security capabilities stored in the UE, receive a second set of security capabilities sent by the MME and check whether the second set of security capabilities are consistent with the first set of security capabilities; and
   the MME configured to receive the TAU Request from the UE, obtain the first set of security capabilities from the TAU Request, and send the second set of security capabilities to the UE.

8. The system of claim 7, wherein the MME comprises:
   an obtaining module, configured to receive the TAU Request message from the UE, obtain the first set of security capabilities from the TAU Request; and
   a delivering module, configured to send the first set of security capabilities.

9. The system of claim 8, wherein the MME further comprises: a selecting module, configured to select a Non Access Signaling (NAS) security algorithm according to the first set of security capabilities.

10. The MME of claim 9, wherein the obtaining module is further configured to obtain a root key currently in use; and the MME further comprises:

a key deducing module, configured to deduce a NAS protection key according to the root key obtained by the obtaining module and the NAS security algorithm selected by the selecting module.

11. A User Equipment (UE) comprising:
an updating module configured to send a Tracking Area Update (TAU) Request message to a Mobility Management Entity (MME), wherein the TAU Request carries a first set of security capabilities; and
a judging module configured to receive a second set of security capabilities sent by the MME, and judge whether the second set of security capabilities are consistent with the stored first set of security capabilities.

12. The UE of claim 11, further comprising:
a storing module configured to store the first set of security capabilities, wherein:
the updating module is further configured to add the first set of security capabilities stored by the storing module into the TAU Request message.

* * * * *

UNITED STATES PATENT AND TRADEMARK OFFICE
CERTIFICATE OF CORRECTION

PATENT NO. : 8,219,064 B2  
APPLICATION NO. : 12/535889  
DATED : July 10, 2012  
INVENTOR(S) : Chengdong He Page 1 of 1

It is certified that error appears in the above-identified patent and that said Letters Patent is hereby corrected as shown below:

In claim 11, column 10, line 2, remove "stored"

Signed and Sealed this  
Twelfth Day of March, 2013

Teresa Stanek Rea  
*Acting Director of the United States Patent and Trademark Office*